(12) United States Patent
Hsu et al.

(10) Patent No.: US 11,315,510 B2
(45) Date of Patent: Apr. 26, 2022

(54) DISPLAY PANEL AND DISPLAY DEVICE

(71) Applicants: BOE OPTICAL SCIENCE AND TECHNOLOGY CO., LTD., Jiangsu (CN); BOE TECHNOLOGY GROUP CO., LTD., Beijing (CN)

(72) Inventors: Hunghuei Hsu, Beijing (CN); Xiuhe Zhou, Beijing (CN)

(73) Assignees: BOE OPTICAL SCIENCE AND TECHNOLOGY CO., LTD., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/641,886

(22) PCT Filed: Apr. 15, 2019

(86) PCT No.: PCT/CN2019/082705
§ 371 (c)(1),
(2) Date: Feb. 25, 2020

(87) PCT Pub. No.: WO2019/205976
PCT Pub. Date: Oct. 31, 2019

(65) Prior Publication Data
US 2020/0251065 A1 Aug. 6, 2020

(30) Foreign Application Priority Data
Apr. 26, 2018 (CN) .......................... 201810385416.8

(51) Int. Cl.
*G09G 3/36* (2006.01)
*G02F 1/1333* (2006.01)
(Continued)

(52) U.S. Cl.
CPC ......... *G09G 3/3651* (2013.01); *G02F 1/1391* (2013.01); *G02F 1/133345* (2013.01);
(Continued)

(58) Field of Classification Search
CPC .. G09G 3/3651; G09G 3/36; G09G 2320/103; G09G 3/34; G09G 3/32;
(Continued)

(56) References Cited

U.S. PATENT DOCUMENTS

| 4,613,209 A | 9/1986 | Goodby et al. |
| 2015/0070607 A1* | 3/2015 | Usukura .............. G02B 3/0081 349/15 |

(Continued)

FOREIGN PATENT DOCUMENTS

| CN | 1366204 A | 8/2002 |
| CN | 1696802 A | 11/2005 |

(Continued)

OTHER PUBLICATIONS

First Office Action dated Mar. 4, 2020 for application No. CN201810385416.8 with English translation attached.

(Continued)

*Primary Examiner* — Pegeman Karimi
(74) *Attorney, Agent, or Firm* — Nath, Goldberg & Meyer; Joshua B. Goldberg

(57) ABSTRACT

The present disclosure provides a display panel and a display device. The display panel is provided with a plurality of sub-pixels, the display panel including: a first substrate and a second substrate opposite to each other, and multistable liquid crystals between the first substrate and the second substrate; wherein, each of the sub-pixels is provided with a first electrode and a second electrode to generate an electric field for the multistable liquid crystals, and the multistable liquid crystals have different optical properties under different electric fields and after an electric field disappears, the multistable liquid crystals can maintain the same optical properties as the electric field exists. The (Continued)

present disclosure also provides a display device, including: the above mentioned display panel.

17 Claims, 2 Drawing Sheets

(51) Int. Cl.
    *G02F 1/1335*     (2006.01)
    *G02F 1/1343*     (2006.01)
    *G02F 1/139*     (2006.01)

(52) U.S. Cl.
    CPC .. *G02F 1/133514* (2013.01); *G02F 1/133553* (2013.01); *G02F 1/134309* (2013.01); *G02F 1/134345* (2021.01); *G02F 2201/52* (2013.01); *G09G 2320/103* (2013.01)

(58) Field of Classification Search
    CPC ................ G02F 1/133345; G02F 1/13; G02F 1/133514; G02F 1/133553; G02F 1/134309; G02F 1/1391
    See application file for complete search history.

(56) References Cited

U.S. PATENT DOCUMENTS

| | | | | |
|---|---|---|---|---|
| 2015/0356939 | A1* | 12/2015 | Hsu | G02F 1/134363 345/206 |
| 2017/0124984 | A1* | 5/2017 | Wang | G02F 1/133553 |
| 2017/0285849 | A1* | 10/2017 | Kim | G06F 3/0447 |
| 2018/0348558 | A1* | 12/2018 | Chida | G02F 1/1343 |
| 2019/0098289 | A1* | 3/2019 | Palmer | G02F 1/13718 |

FOREIGN PATENT DOCUMENTS

| | | |
|---|---|---|
| CN | 101710214 A | 5/2010 |
| CN | 201788333 U | 4/2011 |
| CN | 203414703 U | 1/2014 |
| CN | 104965359 A | 10/2015 |
| CN | 108594556 A | 9/2018 |
| KR | 20160008397 A | 1/2016 |

OTHER PUBLICATIONS

Fourth office action dated Nov. 18, 2021 for application No. CN201810385416.8 with English translation attached.

* cited by examiner

DISPLAY PANEL AND DISPLAY DEVICE

CROSS REFERENCE TO RELATED APPLICATIONS

This is a National Phase Application filed under 35 U.S.C. 371 as a national stage of PCT/CN2019/082705, filed on Apr. 15, 2019, an application claiming priority of Chinese Patent Application No. 201810385416.8, filed on Apr. 26, 2018, the entire contents of each of which are incorporated herein by reference.

TECHNICAL FIELD

The present disclosure relates to field of display technology, in particular to a display panel and a display device.

BACKGROUND

In a related art liquid crystal display device, driving voltages are applied to driving electrodes (such as a pixel electrode and a common electrode) in each sub-pixel to generate an electric field, and the electric field can deflect liquid crystals in a desired manner, so that the sub-pixel can cause light filtering of various degrees to realize display.

SUMMARY

In an aspect of the present disclosure, a display panel is provided to include a plurality of sub-pixels, a first substrate and a second substrate which are opposite to each other, and multistable liquid crystals arranged between the first substrate and the second substrate; and each of the plurality of sub-pixels is provided with a first electrode and a second electrode which are configured to generate an electric field for the multistable liquid crystals, and the multistable liquid crystals have different optical properties under different electric fields and after an electric field disappears, the multistable liquid crystals are able to maintain the same optical properties as the electric field exists.

In an embodiment, the first electrode is arranged on a side of the first substrate proximal to the second substrate; and the second electrode is arranged on a side of the second substrate proximal to the first substrate, and the first electrode and the second electrode are arranged opposite to each other.

In an embodiment, the first electrodes in the plurality of sub-pixels are coupled together as a single piece to form a common electrode and the second electrodes in the plurality of sub-pixels are separate electrodes; or, the second electrodes in the plurality of sub-pixels are coupled together as a single piece to form a common electrode and the first electrodes in the plurality of sub-pixels are separate electrodes.

In an embodiment, the display panel further includes an insulating layer disposed between the separate electrodes and a corresponding substrate on which the separate electrodes are located.

In an embodiment, the display panel further includes a light-reflecting layer disposed on a side of the multistable liquid crystals distal to an light incident side of the display panel.

In an embodiment, the first substrate is closer to the light incident side than the second substrate; and the light-reflecting layer is arranged between the second substrate and the second electrodes.

In an embodiment, the plurality of sub-pixels include sub-pixels of different colors, each sub-pixel is provided with a corresponding color filter, and the color filter is arranged closer to the light incident side than the light-reflecting layer; and the color filter is arranged on a side of the first substrate proximal to the second substrate; or, the color filter is arranged on a side of the second substrate proximal to the first substrate.

In an embodiment, the multistable liquid crystals have different light transmittances under different electric fields.

In an aspect, a display device is provided to include the above display panel; a driver, configured to apply driving voltages to the first electrode and the second electrode to form an electric field; and a controller, coupled to the driver and configured to determine whether to issue a control instruction to the driver according to whether there is a change in a display content of the sub-pixel, the control instruction is configured to control the driver to stop applying the driving voltages to the first electrode and the second electrode in the sub-pixel of which the display content is not changed.

In an embodiment, the display device further includes a data provider configured to provide a display data describing what picture to be displayed; and the controller is configured to determine whether there is a change in the display content of the sub-pixel based on the display data.

In an embodiment, the data provider is configured to provide a new display data only when there is a change in the display content; and the controller is configured to determine whether there is a change in the display content by determining whether the new display data is received.

In an embodiment, in response to no change in the display content of the sub-pixel, the controller is configured to issue a control instruction to the driver, the control instruction is configured to control the driver to stop applying the driving voltages to the first electrode and the second electrode in the sub-pixel of which the display content is not changed; in response to a change in the display content of the sub-pixel, the controller is configured not to issue the control instruction to the driver, and the driver is configured to maintain applying the driving voltages to the first electrode and the second electrode.

In an embodiment, the controller is configured to issue a control instruction to the driver to stop operation only when the display contents of all the plurality of sub-pixels are unchanged.

In an embodiment, after the driver has stopped operation, the controller is configured to control the driver to resume operation in response to a change in the display content of at least part of the sub-pixels.

In an embodiment, under a first electric field provided by the driver, molecules of the multistable liquid crystals are regularly arranged to allow light to enter the display panel and then be emitted from the display panel, and under a second electric field provided by the driver which is different from the first electric field, molecules of the multistable liquid crystals are irregularly arranged, so that light is reflected within the display panel and then is absorbed and cannot be emitted.

In an embodiment, under a third electric field provided by the driver which is between the first electric field and the second electric field, light enters the display panel, and one part of the light is emitted from the display panel and the other part of the light cannot be emitted.

DETAIL DESCRIPTION OF EMBODIMENTS

The present disclosure will be described in details below in conjunction with the accompanying drawings and embodiments such that those skilled in the art can understand the technical solution of the present disclosure better.

In the related art liquid crystal display device, a backlight is generally necessary, and the power consumption of the backlight is high. In this case, a reflective display device without the backlight occurs.

In addition, in the related art liquid crystal display device, a final picture cannot be maintained if power is turned off and the liquid crystals must be maintained in a desired deflection state with an electric field. Thus, it is required to apply driving voltages to driving electrodes for realizing the display, which results in a high power consumption. In addition, in the related art liquid crystal display device, a polarizer is required to control a polarization of light, which inevitably causes a loss in brightness and affects a utilization efficiency of light.

The present disclosure provides a reflective display device with low power consumption and high brightness, which at least partially solves the above problems in the related art liquid crystal display device.

Figure 1:
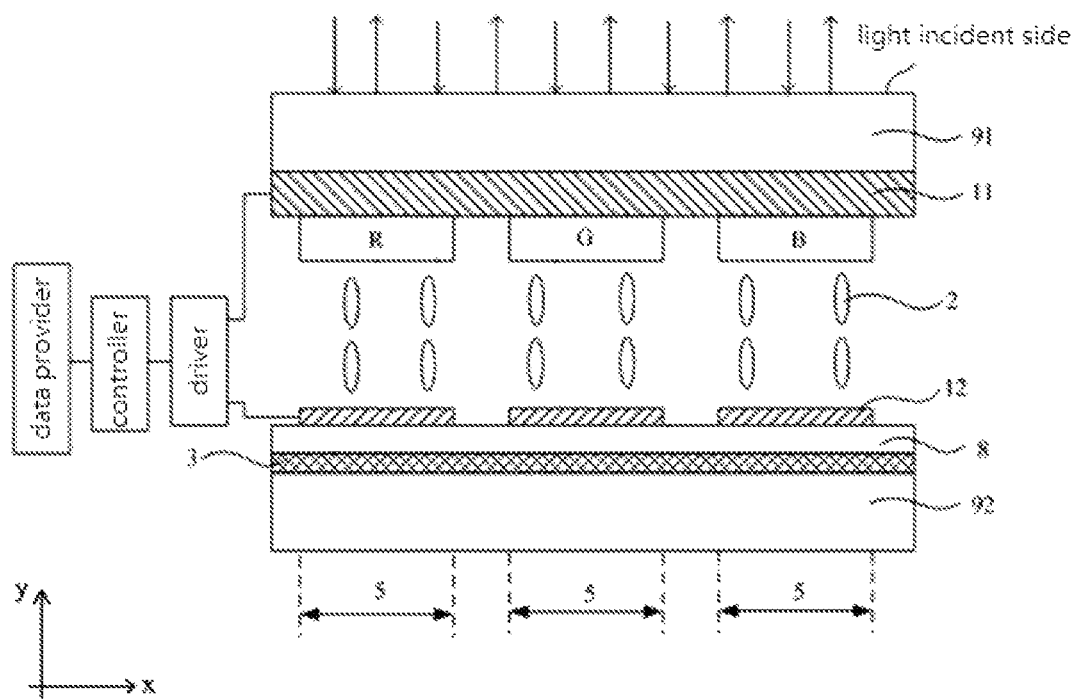
FIG. 1 is a schematic diagram illustrating a partial cross-sectional view of a structure of a display device under a first electric field according to an embodiment of the present disclosure.
Figure 2:
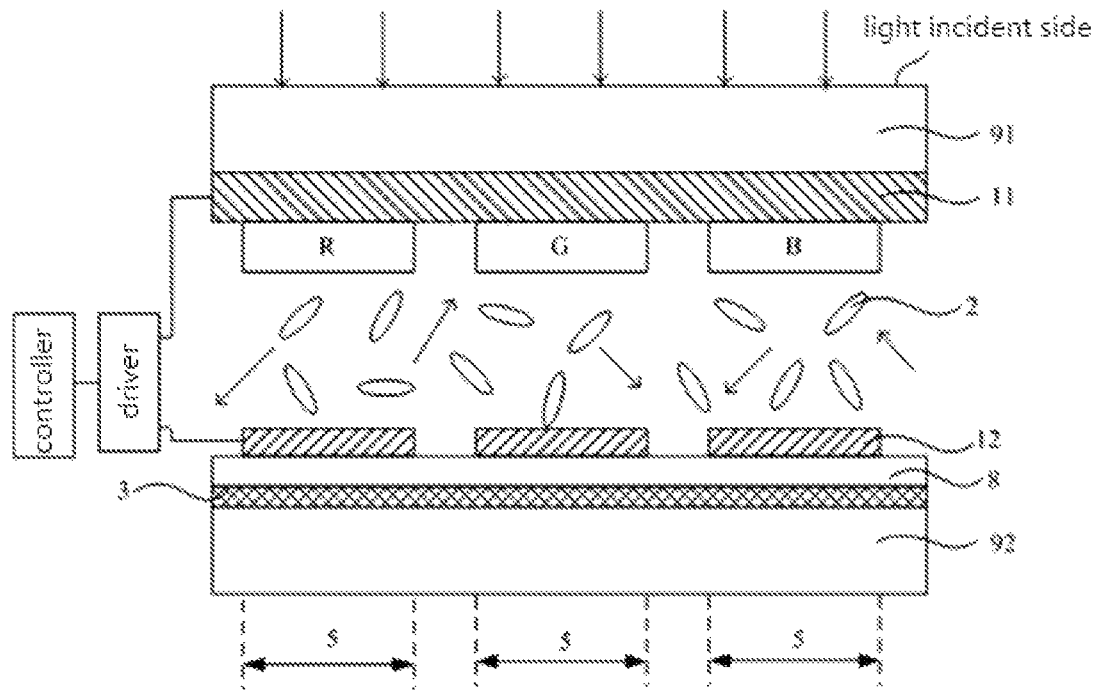
FIG. 2 is a schematic diagram illustrating a partial cross-sectional view of a structure of a display device under a second electric field according to an embodiment of the present disclosure.

FIG. 1 is a schematic diagram illustrating a partial cross-sectional view of a structure of a display device under a first electric field according to an embodiment of the present disclosure; FIG. 2 is a schematic diagram illustrating a partial cross-sectional view of a structure of a display device under a second electric field according to an embodiment of the present disclosure. FIGS. 1 and 2 schematically show light rays. As shown in FIGS. 1 and 2, the present embodiment provides a display device including:

a display panel having a plurality of sub-pixels 5, the display panel including a first substrate 91 and a second substrate 92 opposite to each other, and multistable liquid crystals 2 provided between the first substrate 91 and the second substrate 92; wherein, each of the sub-pixels 5 is provided with a first electrode 11 and a second electrode 12 to generate an electric field for the multistable liquid crystals 2, the multistable liquid crystals 2 have different optical properties under different electric fields and after an electric field disappears, the multistable liquid crystals 2 can maintain the same optical properties as the electric field exists;

a driver configured to apply driving voltages to the first electrode 11 and the second electrode 12 to generate an electric field; and a controller coupled to the driver and configured to determine whether to issue a control instruction to the driver according to whether there is a change in a display content of the sub-pixel 5, the control instruction being configured to control the driver to stop applying the driving voltages to at least the first electrode 11 and the second electrode 12 in the sub-pixel 5 of which the display content is not changed.

As shown in FIG. 1, each sub-pixel 5 is a display minimum unit divided in the x direction. A first electrode 11 and second electrode 12 are provided in the sub-pixel 5.

In one embodiment of the present disclosure, the first substrate 91 and the second substrate 92 may be glass substrates. In other embodiments of the present disclosure, the first substrate 91 and the second substrate 92 may be substrates made of other materials, and may be made of the same or different materials. In one embodiment of the present disclosure, the first electrode 11 may be made of an ITO (indium tin oxide) material, and the second electrode 12 may be made of a metal material. In other embodiments of the present disclosure, the first electrode 11 and the second electrode 12 may be electrodes made of other materials, and may be made of the same or different materials. In one embodiment of the present disclosure, the first electrodes 11 in all sub-pixels 5 are connected together as a single piece to form one common electrode, and the second electrodes 12 in the sub-pixels 5 are separate and serve as pixel electrodes. Alternatively, the second electrodes 12 in all sub-pixels 5 are connected together as a single piece to form one common electrode, and the first electrodes 11 are separate and serve as pixel electrodes.

The display device of this embodiment has a display panel, which includes two substrates facing each other, and multistable liquid crystal 2 are filled between the two substrates, and molecules of the multistable liquid crystals 2 are regularly arranged; and two electrodes are provided in each sub-pixel 5 and can generate an electric field for the multistable liquid crystals 2 at the sub-pixel 5, thereby changing the state and optical properties of the multistable liquid crystals 2 and thereby causing the sub-pixel 5 to display the desired content. The multistable liquid crystal 2 is a known liquid crystal material, which has different states under different electric fields and can generate different optical properties (such as light transmittance, light polarization direction); after the electric field disappears, as long as no other electric field is applied to the multistable liquid crystals 2 or the multistable liquid crystals 2 are in a special physical environment such as a high temperature (more than 80 degrees) and the like, the multistable liquid crystals 2 still maintain the previous state, that is, the previous optical properties under the previous electric field.

The display device is also provided with a controller. The controller is configured to detect whether there is a change in the display content of the sub-pixels 5 in the display panel (namely whether static pictures are displayed by at least part of the sub-pixels 5) and determine whether to issue a control instruction according to the change; if the control instruction is issued, the driver can be controlled to stop applying drive voltages to at least the sub-pixels 5 at which static pictures are displayed, thereby reducing the output of the driver and reducing the power consumption. If the display content of the sub-pixel is not changed, the controller is configured to send a control instruction to the driver, wherein the control instruction is used for controlling the driver to stop applying the driving voltages to the first electrode and the second electrode in the sub-pixel of which the display content is not changed; If the display content of the sub-pixel is changed, the controller is configured not to issue the control instruction to the driver, and the driver still applies the driving voltages to the first electrode and the second electrode.

No voltages are applied to the first electrode 11 and the second electrode 12 of the sub-pixel 5, so that the electric field between the first electrode 11 and the second electrode 12 disappears. However, the multi-stable liquid crystals 2 are used in the display panel, at this time, the state and the optical properties of the multi-stable liquid crystals 2 at the sub-pixel 5 are not changed, so that the sub-pixels 5 still maintain displaying the previous content (namely the content obtained after the last change), and the display effect is not affected.

In the display device of this embodiment, the controller controls the driver to stop applying the driving voltages to the corresponding sub-pixel 5 (or to make the driver sleep as a whole) when the display content is not changed, thereby reducing the output of the driver and the driving power consumption. Meanwhile, since the multistable liquid crystals 2 are used, the sub-pixels 5 can maintain the previously displayed content without an electric field, in such a manner that the display effect is not affected.

In the display device of this embodiment, there are various means by which the controller learns whether the display content of the sub-pixel 5 is changed. For example, the controller may analyze the display data (i.e., data for describing what picture should be displayed) of each frame from a data provider (e.g., a graphics card) shown in FIG. 1, and determine whether part of locations are same in the pictures of the adjacent frames; Alternatively, the data provider may provide a new display data only when there is a change in the display content, so the controller may determine whether the display content is changed by determining whether the new display data is received.

In the display device of this embodiment, the multistable liquid crystals 2 may have two different states under only two different electric fields and two corresponding optical properties (e.g. light transmission and light proof), so that the sub-pixels 5 can only realize two (e.g. black and white) displays. Alternatively, the multistable liquid crystals 2 may have a plurality of different states under a plurality of different electric fields and have a plurality of corresponding optical properties (e.g., different degrees of light transmission), so that the sub-pixels 5 can realize displays at a plurality of different gray levels (e.g., 16 gray levels).

Figure 4:
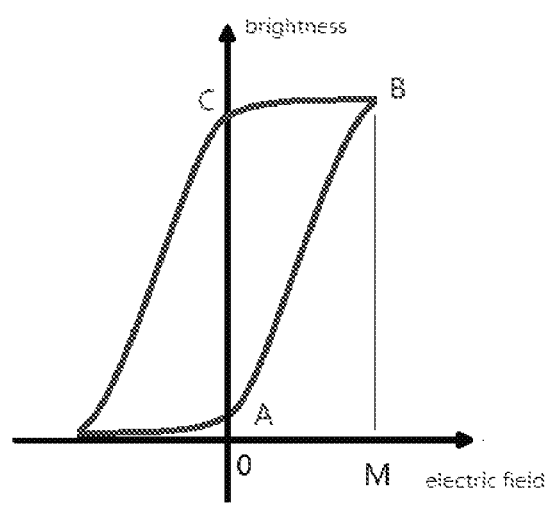
FIG. 4 is a schematic diagram illustrating a correspondence between brightness of a sub-pixel and an electric field in a display device according to an embodiment of the present disclosure.

In one embodiment of the present disclosure, the actual brightness of the sub-pixels 5 can be plotted against the electric field (intensities of the electric field) as shown in FIG. 4. FIG. 4 is a schematic diagram illustrating the correspondence between the brightness of the sub-pixels and the electric field in the display device according to the embodiment of the present disclosure. When the intensity of the electric field between the first electrode 11 and the second electrode 12 is increased from 0 to M, the brightness of the sub-pixel 5 is also increased from A to B, and when the intensity is decreased to 0 (i.e., when the driving voltages are no longer applied to the first electrode 11 and the second electrode 12), the brightness of the sub-pixel 5 is slightly decreased to C. However, since a difference between the brightness at B and C is small and is within the range of unavoidable errors, and thus is not perceived by human eyes, it is still considered that the state and optical properties of the multistable liquid crystals 2 are not changed after the electric field disappears.

In one embodiment of the present disclosure, the controller and the driver may be integrated circuits, chips, processors, etc. independent of each other, or may be integrated in one integrated circuit, chip, processor, etc.

In one embodiment of the present disclosure, the driver may supply the electrodes in each sub-pixel 5 with drive voltages via separate leads (the driver is only coupled to the first electrode 11 and the second electrode 12 of one sub-pixel 5, as schematically depicted in FIGS. 1 and 2). In other embodiments of the present disclosure, the driver may also apply the driving voltages to the electrodes in each sub-pixel 5 in a scanning manner with a gate line and a data line. In one embodiment of the present disclosure, the first electrodes 11 are disposed on a side of the first substrate 91 proximal to the second substrate 92; The second electrodes 12 are disposed on a side of the second substrate 92 proximal to the first substrate 91 and opposite to the first electrodes 11.

That is, the two electrodes can be respectively disposed inside the two substrates and arranged opposite to each other, thereby most effectively generating an electric field for the multistable liquid crystals 2.

In one embodiment of the present disclosure, the sub-pixels 5 have different colors, and corresponding color filters are disposed in the sub-pixels 5.

That is, each sub-pixel 5 of the display panel may be provided with a color filter of a corresponding color (e.g., a red color filter R, a green color filter G, or a blue color filter B), so as to filter the light emitted from the sub-pixel 5 into the corresponding color, thereby realizing a color display. If the sub-pixels 5 can display at a plurality of different gray levels, the display device can realize a full color display.

A plurality of adjacent sub-pixels 5 with different colors (such as a red sub-pixel, a green sub-pixel, a blue sub-pixel) can form one pixel, and the pixel is used as one minimum visible point in the display panel.

In one embodiment of the present disclosure, the controller is configured to issue a control instruction to the driver only when the display contents of all the sub-pixels 5 are not changed, to control the driver to stop operation.

That is, in one embodiment of the present disclosure, the controller issues a control instruction to control the driver to stop operation (i.e., to sleep) entirely only when the entire display content of the display panel is a static picture; If only a part of the picture of the display panel is static (i.e. there is on change in the display content in only part of the sub-pixels 5), the control instruction is not issued, so that the driver still applies the driving voltages to the sub-pixels 5 with the changed and unchanged display content.

Even if only part of the sub-pixels are provided with the driving voltage, the driver is still in an operating state and still has a high power consumption, and when the driver stops operation and enters a sleep state, almost no power consumption exists, so that the energy-saving effect is most obvious. Therefore, by this way, the driving power consumption and the difficulty for control can be obviously reduced.

It should be understood that, after the driver stops operation as a whole, if at least part of the display contents of the sub-pixels 5 are changed, the controller should control the driver to resume the operation (i.e. wake up). Therefore, the driver is actually in a "semi-sleep" state, and can start the operation again at any time, instead of a "completely off" state in which the display device is completely turned off.

It should be understood that, it is also possible that the controller issues a control command to control the driver to stop supplying the driving voltages to the sub-pixels 5 whose display contents are not changed (of course, if the display contents of all the sub-pixels 5 are not changed, the driver also stops supplying the driving voltages to all the sub-pixels 5). By this way, the driving power consumption can be reduced to the utmost extent.

In one embodiment of the present disclosure, as shown FIGS. 1 and 2, the first electrode 11 is disposed on a side of the first substrate 91 proximal to the second substrate 92; The second electrodes 12 are disposed on a side of the second substrate 92 proximal to the first substrate 91, and the first electrode 11 and the second electrode 12 in the same sub-pixel 5 are disposed opposite to each other. The first electrodes 11 in all sub-pixel 5 are connected together as a single piece to form one common electrode, or the second electrodes 12 in all sub-pixel 5 are connected together as a single piece to form one common electrode.

As shown in FIGS. 1 and 2, in the display device which provides the control instruction only when all the display contents are not changed, if the first electrode 11 and the second electrodes 12 are disposed opposite to each other in the above-mentioned manner, one of the electrodes (taking the first electrode 11 as an example) may be a common electrode. That is, the first electrodes 11 in the plurality of sub-pixels 5 may be connected together as a single piece and applied with the same driving voltage, so that the manufacturing process thereof may be simplified and a circuit for supplying power to the first electrode 11 may be simplified.

In one embodiment of the present disclosure, the display panel is a reflective display panel having a light incident side and a light emergent side (not shown in the figure), which are the same side light is incident from one side and emitted from the same side), and a light-reflecting layer 3 is provided at a side of the multistable liquid crystals 2 distal to the light incident side.

That is, in one embodiment of the present disclosure, the display panel is reflective, that is, as shown in FIG. 1, light can enter from the light incident side of the display panel, pass through the multistable liquid crystals 2, and be reflected by the light-reflecting layer 3, then pass through the multistable liquid crystals 2 again, and be emitted outside from the light incident side, so as to realize the display. The reflective display panel has an advantage in that it does not need a backlight for providing light, so that there is no power consumption for the backlight, and the whole power consumption can be further reduced.

In one embodiment of the present disclosure, as shown in FIGS. 1 and 2, the first substrate 91 is closer to the light incident side than the second substrate 92; The first electrode 11 is disposed on a side of the first substrate 91 proximal to the second substrate 92; The second electrodes 12 are disposed on a side of the second substrate 92 proximal to the first substrate 91, and the first electrode 11 and the second electrode 12 in the same sub-pixel 5 are disposed opposite to each other; The light-reflecting layer 3 is disposed between the second substrate 92 and the second electrodes 12.

That is, in one embodiment of the present disclosure, for the above display device where the reflective display panel and the electrodes disposed opposite to each other are used, the light-reflecting layer 3 is provided on the substrate (the second substrate 92) far away from the light incident side, and is farther away from the multistable liquid crystals 2 than the second electrodes 12 to avoid the influence on the electric field and cause the electrodes to generate the electric field for the multistable liquid crystals 2 more effectively.

It should be understood that, if the light-reflecting layer 3 is made of a conductive material such as metal, at least one insulating layer 8 should be provided between the light-reflecting layer 3 and the second electrodes 12, as shown in FIGS. 1 and 2; so that the second electrodes 12 are not coupled to each other.

It should be understood that, the second electrodes 12 may also serve as the light-reflecting layer 3 if the second electrodes 12 are formed of a light-reflecting material, That is, there may be no separate light-reflecting layer in the display panel. And since the second substrate 92 is insulating, the insulating layer 8 can be omitted at the same time.

As shown in FIGS. 1 and 2, the first electrode 11 on the first substrate 91 is described as an example of a common electrode, and thus the common electrode is closer to the light incident side than the pixel electrodes (second electrodes 12). It will be appreciated that it is also possible that if the second electrode 12 is in the form of a common electrode, so that the common electrode is further from the light incident side than the pixel electrodes.

In one embodiment of the present disclosure, the sub-pixels 5 are divided into different colors, and color filters (R, G, B) corresponding to the different colors are disposed in the sub-pixels 5, and the color filters are closer to the light incident side than the light-reflecting layer 3; The color filters are disposed on a side of the first substrate 91 proximal to the second substrate 92; Alternatively; the color filters are disposed on a side of the second substrate 92 proximal to the first substrate 91.

That is, for the above display device where the reflective display panel and the electrodes disposed opposite to each other are used, color filters may be provided to realize a color display; Obviously; the color filters must be farther away from the light incident side than the light-reflecting layer 3, so as to ensure that the reflected light can pass through the color filters. In the embodiment of the present disclosure, the light incident side and the light emergent side are the same, so that the color filters are closer to the light incident side than the light-reflecting layer 3, so as to ensure that the reflected light can pass through the color filters.

Specifically, as shown in FIG. 1 and FIG. 2, the color filters may be disposed on a side of the first electrode 11 proximal to the second substrate 92.

Figure 3:
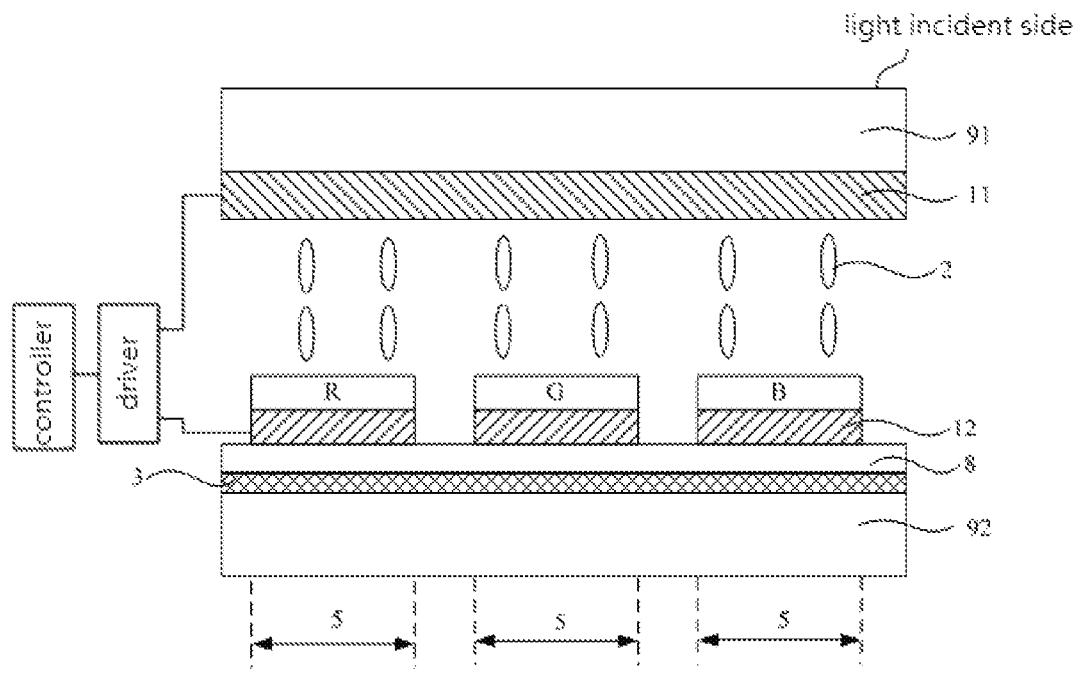
FIG. 3 is a schematic diagram illustrating a partial cross-sectional view of a structure of a display device under the first electric field according to another embodiment of the present disclosure.

FIG. 3 is a partial cross-sectional schematic diagram illustrating a structure of a display device under a first electric field according to an embodiment of the present disclosure. The embodiment shown in FIG. 3 differs from the embodiment shown in FIG. 1 in that in FIG. 3, color filters are disposed on a side of the second electrodes 12 proximal to the first substrate 91, and light is not shown therein. For simplicity, the same reference numerals denote the same elements, and a repetitive description is omitted.

In other embodiments of the present disclosure, it is also possible that the color filters are located between the substrate and the electrodes (between the first substrate and the first electrode or between the second substrate and the second electrodes), or are located on a side of the first substrate proximal to the light incident side.

In one embodiment of the present disclosure, the multistable liquid crystals 2 have different light transmittances under different electric fields.

That is, the multistable liquid crystals 2 may have different degrees of transparency under different electric fields, thereby causing the sub-pixels 5 to have different brightness. For example, as shown in FIG. 1, under a first electric field, the molecules of the multistable liquid crystals 2 are regularly arranged so that the multistable liquid crystals 2 as a whole are substantially transparent, allowing light (including light reflected h the light-reflecting layer 3) to pass through the multistable liquid crystals 2, at which time the sub-pixels 5 have maximum brightness. That is, the display device is in a bright state.

As shown in FIG. 2, under a second electric field, which is different from the first electric field, the molecules of the multistable liquid crystals 2 are arranged irregularly, so that the incident light can be scattered irregularly, and a large amount of the light is reflected in the multistable liquid crystals 2 and then is absorbed and cannot be emitted, so that the multistable liquid crystals 2 are opaque as a whole, and the brightness of the sub-pixels 5 is minimum. That is, the display device is in a dark state. Note that FIGS. 1 and 2 only schematically show the state where the light rays are incident and reflected, for the sake of simplicity.

Under a third electric field provided by the driver, which is between the first electric field and the second electric field, light enters the display panel, and a part of the light is emitted from the display panel while the other part of the light cannot emitted.

It should be understood that, the above multistable liquid crystals 2 having different light transmittances are not limited to be used in the above reflective display panel, but may be used in a transmissive display panel.

In a conventional liquid crystal display device, a polarizer is required to control the polarization of light, but the light passing through the polarizer is reduced by at least more than 50%, resulting in a decrease in brightness. The use of the multistable liquid crystals 2 has the advantages in that a polarizer is not required to control the polarization of light, and light emitted from the sub-pixels 5 does not need to be filtered by the polarizer, so that the inevitable brightness loss does not exist, the utilization rate of light can be improved, and the structure of the display panel can be simplified (that is, the polarizer is not required to be arranged in the display panel).

In one embodiment of the present disclosure, the display device is any one of an electronic calendar, an electronic watch, an electronic gas meter, an electronic electric meter, and an electronic water meter.

As described above, the display device of the present embodiment can save the energy mainly when the display content is not changed; Compared with a computer display and the like, the display contents of the above devices are relatively less changed (for example, the display contents of the electronic calendar may be changed once a day), so the embodiment is particularly suitable for the above devices, and the display device can still maintain the final picture after power is off.

It is to be understood that the above embodiments are merely exemplary embodiments employed for illustrating the principles of the present disclosure, and the present disclosure is not limited thereto. Various modifications and improvements may occur to those skilled in the art without departing from the spirit and scope of the present disclosure and are intended to be within the scope of the present disclosure.

What is claimed is:

1. A display panel, comprising a plurality of sub-pixels, wherein the display panel comprises a first substrate and a second substrate which are opposite to each other, and multistable liquid crystals arranged between the first substrate and the second substrate; and each of the plurality of sub-pixels is provided with a first electrode and a second electrode which are configured to generate an electric field for the multistable liquid crystals, and the multistable liquid crystals have different optical properties under different electric fields and after an electric field disappears, the multistable liquid crystals are able to maintain the same optical properties as the electric field exists;

the first electrode is arranged on a side of the first substrate proximal to the second substrate;

the second electrode is arranged on a side of the second substrate proximal to the first substrate, and the first electrode and the second electrode are arranged opposite to each other;

the display panel further comprises a light-reflecting layer disposed on a side of the multistable liquid crystals distal to a light incident side of the display panel;

the first substrate is closer to the light incident side than the second substrate; and the light-reflecting layer is arranged between the second substrate and the second electrodes.

2. The display panel of claim 1, wherein, the first electrodes in the plurality of sub-pixels are coupled together as a single piece to form a common electrode and the second electrodes in the plurality of sub-pixels are separate electrodes; or, the second electrodes in the plurality of sub-pixels are coupled together as a single piece to form a common electrode and the first electrodes in the plurality of sub-pixels are separate electrodes.

3. The display panel of claim 2, further comprising an insulating layer disposed between the separate electrodes and a corresponding substrate on which the separate electrodes are located.

4. The display panel of claim 1, wherein, the plurality of sub-pixels comprise sub-pixels of different colors, each sub-pixel is provided with a corresponding color filter, and the color filter is arranged closer to the light incident side than the light-reflecting layer; and the color filter is arranged on a side of the first substrate proximal to the second substrate; or, the color filter is arranged on a side of the second substrate proximal to the first substrate.

5. The display panel of claim 1, wherein the multistable liquid crystals have different light transmittances under different electric fields.

6. A display device, comprising:

a display panel, which comprises a plurality of sub-pixels, wherein the display panel comprises a first substrate and a second substrate which are opposite to each other, and multistable liquid crystals arranged between the first substrate and the second substrate; and each of the plurality of sub-pixels is provided with a first electrode and a second electrode which are configured to generate an electric field for the multistable liquid crystals, and the multistable liquid crystals have different optical properties under different electric fields and after an electric field disappears, the multistable liquid crystals are able to maintain the same optical properties as the electric field exists;

a driver, configured to apply driving voltages to the first electrode and the second electrode to form an electric field; and a controller, coupled to the driver and configured to determine whether to issue a control instruction to the driver according to whether there is a change in a display content of the sub-pixel, wherein the control instruction is configured to control the driver to stop applying the driving voltages to the first electrode and the second electrode in the sub-pixel of which the display content is not changed.

7. The display device of claim 6, further comprising a data provider configured to provide a display data describing what picture to be displayed; wherein the controller is configured to determine whether there is a change in the display content of the sub-pixels based on the display data.

8. The display device of claim 7, wherein the data provider is configured to provide a new display data only when there is a change in the display content, and the controller is configured to determine whether there is a change in the display content by determining whether the new display data is received.

9. The display device of claim 8, wherein, in response to no change in the display content of the sub-pixel, the controller is configured to issue a control instruction to the driver, the control instruction is configured to control the driver to stop applying the driving voltages to at least the first electrode and the second electrode in the sub-pixel of which the display content is not changed; in response to a change in the display content of the sub-pixel, the controller is configured not to issue the control instruction to the driver, and the driver is configured to maintain applying the driving voltages to the first electrode and the second electrode.

10. The display device of claim 9, wherein the controller is configured to issue a control instruction to the driver to stop operation only when the display contents of all the plurality of sub-pixels are unchanged.

11. The display device of claim 10, wherein after the driver has stopped operation, the controller is configured to control the driver to resume operation in response to a change in the display content of at least part of the sub-pixels.

12. The display device of claim 6, wherein,
under a first electric field provided by the driver, molecules of the multistable liquid crystals are regularly arranged to allow light to enter the display panel and then be emitted from the display panel,
under a second electric field provided by the driver which is different from the first electric field, molecules of the multistable liquid crystals are irregularly arranged, so that light is reflected within the display panel and then is absorbed and cannot be emitted.

13. The display device of claim 12, wherein under a third electric field provided by the driver which is between the first electric field and the second electric field, light enters the display panel, and one part of the light is emitted from the display panel and the other part of the light cannot be emitted.

14. The display device of claim 6, wherein,
the first electrode is arranged on a side of the first substrate proximal to the second substrate;
the second electrode is arranged on a side of the second substrate proximal to the first substrate, and the first electrode and the second electrode are arranged opposite to each other.

15. The display device of claim 14, wherein, the display panel further comprises a light-reflecting layer disposed on a side of the multistable liquid crystals distal to a light incident side of the display panel.

16. The display device of claim 15, wherein,
the first substrate is closer to the light incident side than the second substrate; and
the light-reflecting layer is arranged between the second substrate and the second electrodes.

17. The display device of claim 16, wherein,
the plurality of sub-pixels comprise sub-pixels of different colors, each sub-pixel is provided with a corresponding color filter, and the color filter is arranged closer to the light incident side than the light-reflecting layer; and
the color filter is arranged on a side of the first substrate proximal to the second substrate; or, the color filter is arranged on a side of the second substrate proximal to the first substrate.

* * * * *